United States Patent [19]
Yamamoto et al.

[11] Patent Number: 4,693,029
[45] Date of Patent: Sep. 15, 1987

[54] FISHING ROD

[75] Inventors: Shigeru Yamamoto; Masaru Akiba, both of Tokyo, Japan

[73] Assignee: Daiwa Seiko Inc., Tokyo, Japan

[21] Appl. No.: 816,641

[22] Filed: Jan. 6, 1986

[30] Foreign Application Priority Data

Jan. 31, 1985 [JP] Japan ................................. 60-17486

[51] Int. Cl.4 ............................................. A01K 87/06
[52] U.S. Cl. ............................................. 43/22; 43/23
[58] Field of Search ............... 43/20, 22, 23; 403/395, 403/263; 294/49

[56] References Cited

U.S. PATENT DOCUMENTS

| | | | |
|---|---|---|---|
| 2,219,474 | 10/1940 | Dempsey | 43/22 |
| 2,514,950 | 7/1950 | Harrington | 43/23 |
| 3,256,031 | 6/1966 | Fillweber | 403/375 |
| 3,811,215 | 5/1974 | Fleischer | 403/263 |
| 4,077,150 | 3/1978 | Barnes | 43/23 |
| 4,178,713 | 12/1979 | Higuchi | 43/18.5 |
| 4,398,369 | 8/1983 | Wiebe | 43/23 |
| 4,463,512 | 8/1984 | McCreery | 43/22 |
| 4,516,351 | 5/1985 | Highby | 43/22 |
| 4,535,561 | 8/1985 | Hlava | 43/22 |

FOREIGN PATENT DOCUMENTS 1126510  6/1982  Canada ................................. 43/24

Primary Examiner—Kurt Rowan
Attorney, Agent, or Firm—Browdy and Neimark

[57] ABSTRACT

A fishing rod is provided with a flat reel seat formed on the upper side of a hollow tubular rod made of a reinforcing fiber impregnated with a thermosetting synthetic resin. A handle is securely fitted to a tubular extended portion integrally formed with the rear portion of said reel seat in such a manner that part of said tubular extended portion is exposed. Hoods for fixing the feet of a reel are mounted in front and rear of said reel seat so as to face each other.

4 Claims, 29 Drawing Figures

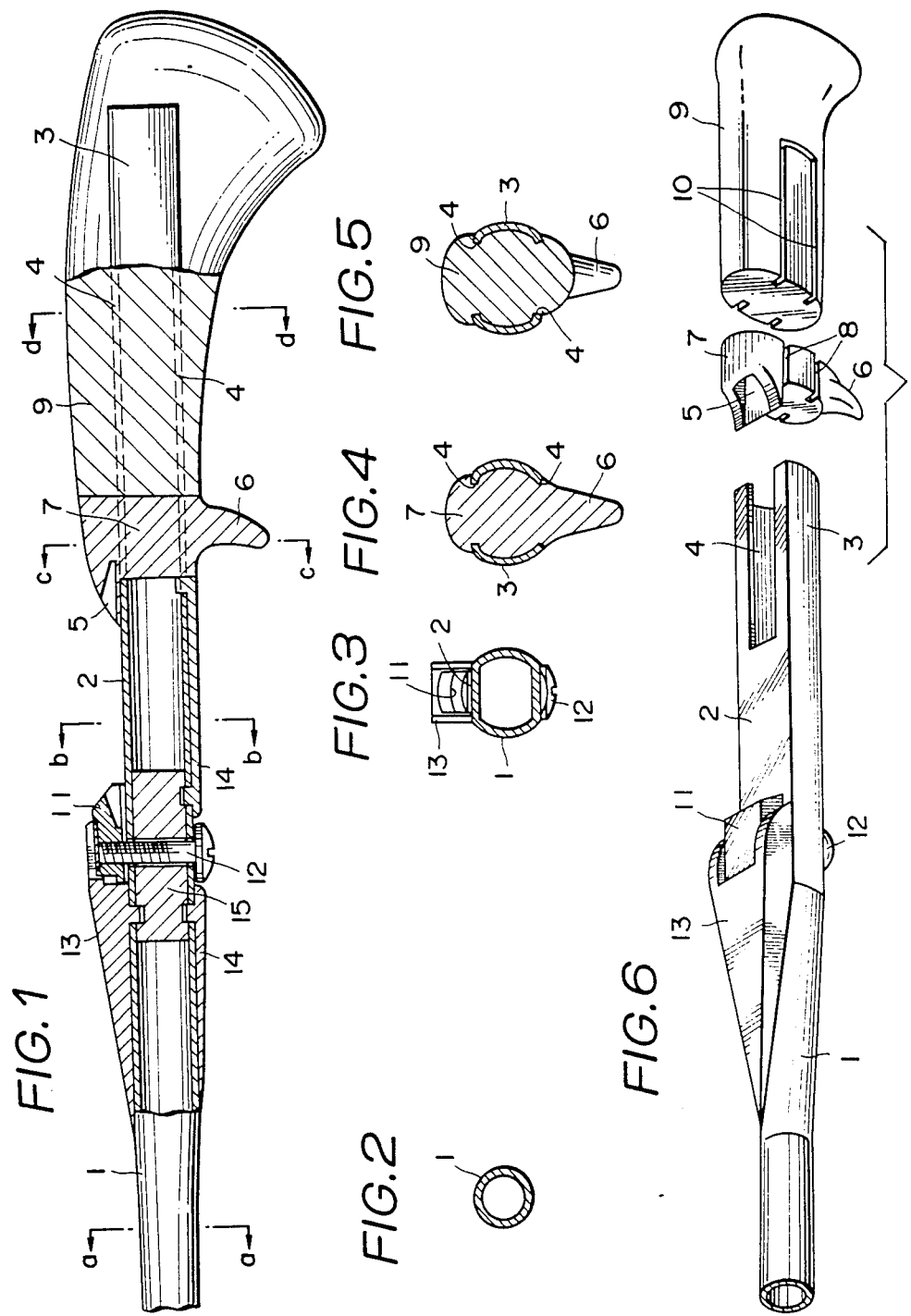

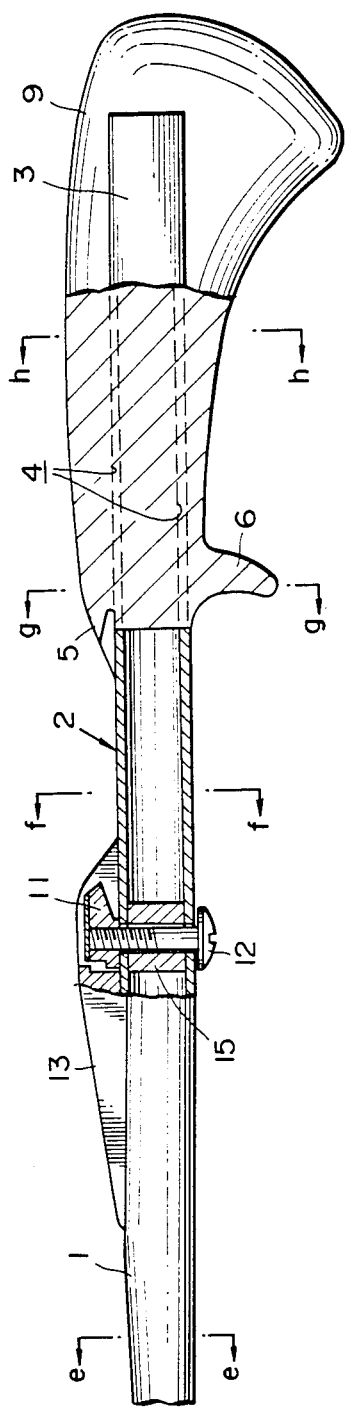
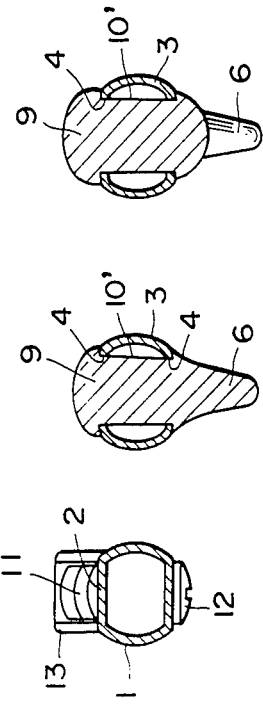
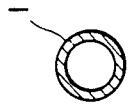

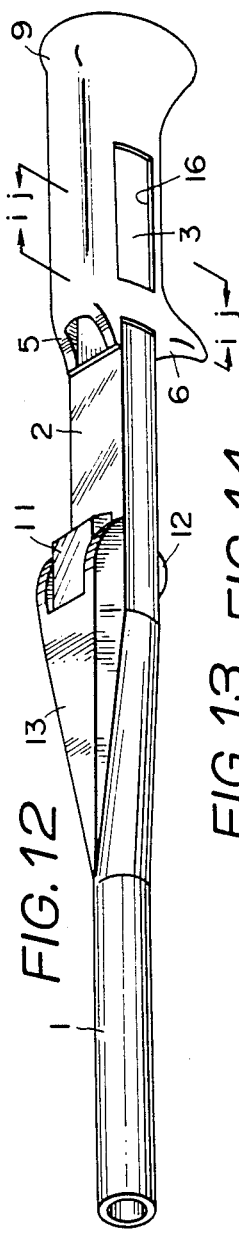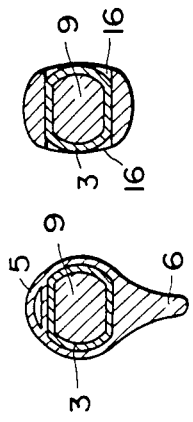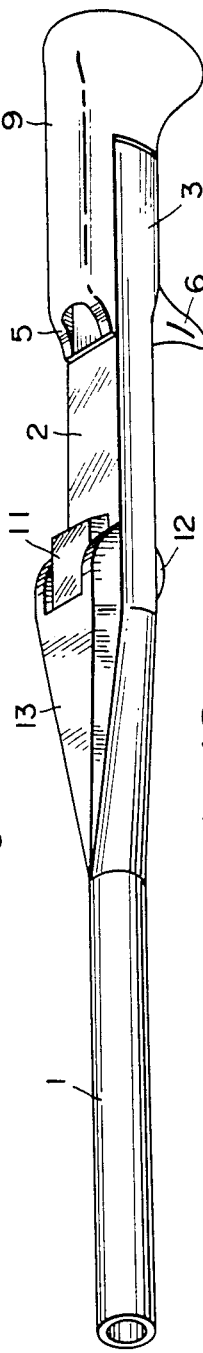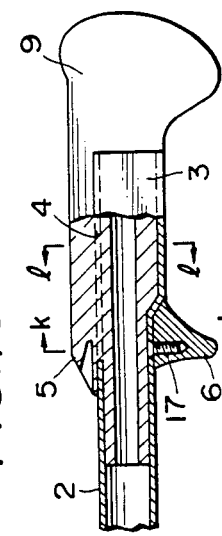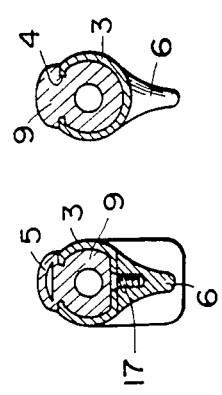

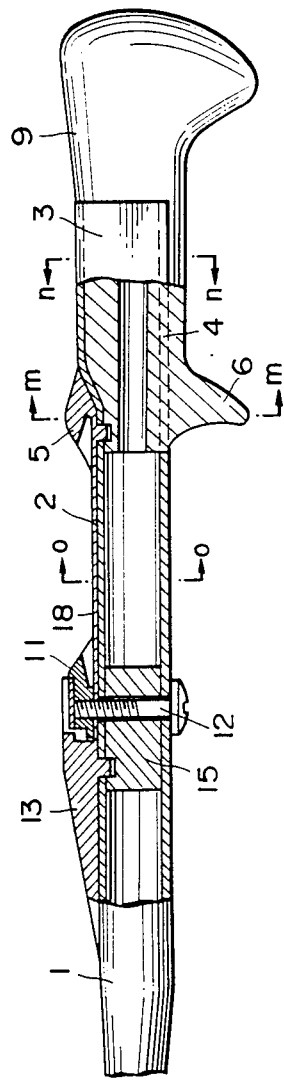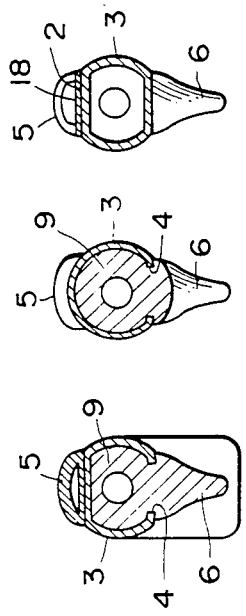
FIG.19 FIG.20 FIG.21 FIG.22

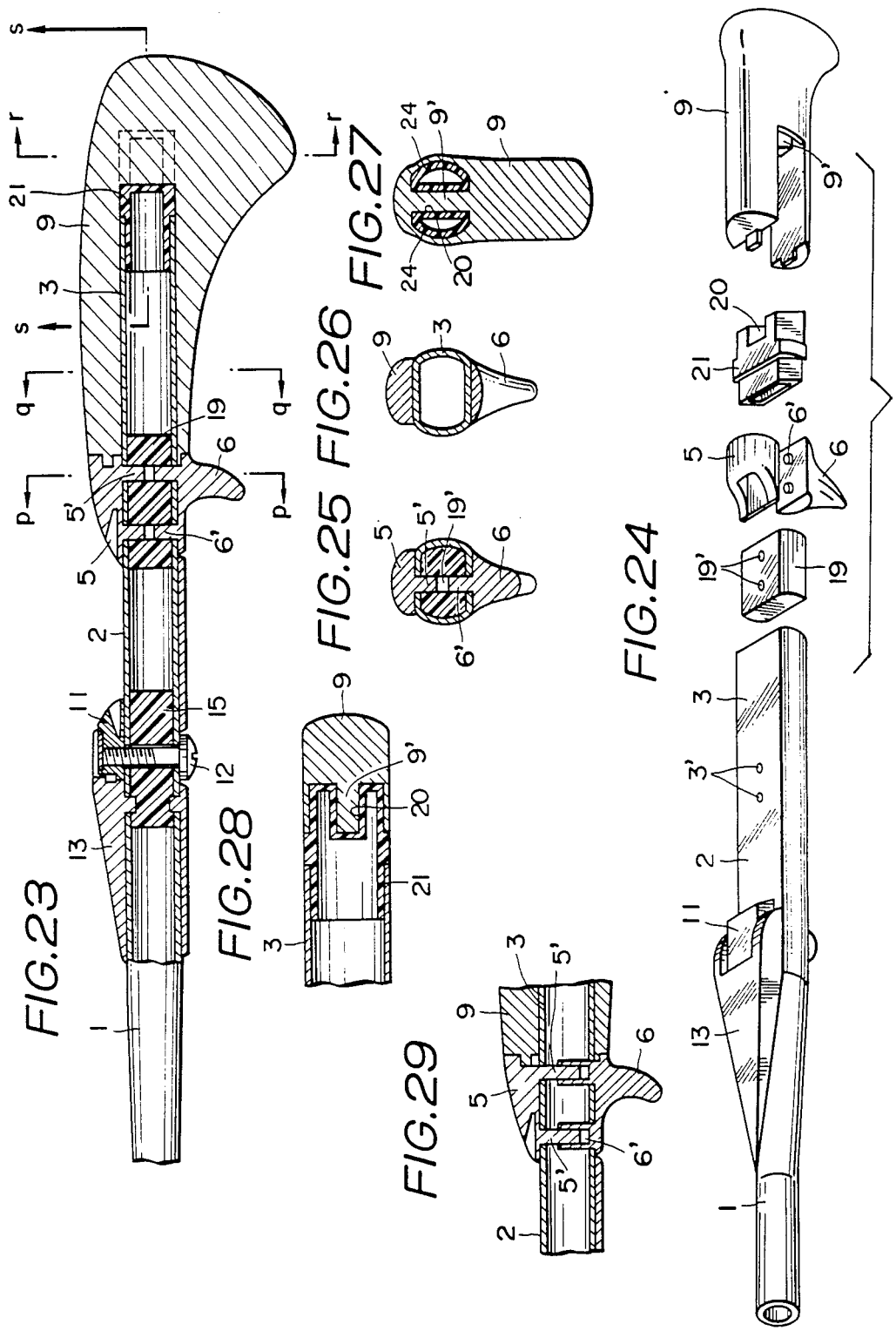

FISHING ROD

BACKGROUND OF THE INVENTION

1. Field of the Invention

The present invention relates to an improvement to the handle portion of a fishing rod which has an attached casting handle.

2. Description of the Prior Art

A known cast fishing rod with a handle is arranged in such a manner that a tubular rod is securely fixed to the front portion of a handle which has a reel seat, and the reel seat of the handle is gripped while fishing. Such a fishing rod is disclosed in the specifications of, for example, U.S. Pat. No. 4,043,071, U.S. Pat. No. 4,355,480, etc. This type of fishing rod, however, tends to break at the portion where the handle is inserted. To prevent this, the handle is made thick and strong, which makes the whole rod heavy and bulky. In particular, the handle is formed with a separate material from that of the tubular rod, such as synthetic resin, cork, or the like, and the force of the bite of the fish is greatly reduced when it is propagated to the handle portion, making it impossible for the fisherman to sense very small bites accurately.

SUMMARY OF THE INVENTION

In view of the above-described disadvantages, it is a primary object of the present invention to provide a fishing rod which has a casting handle attached thereto in which the handle portion is made stronger and lighter so as to enable the realization of comfortable, smooth, and easy fishing.

More specifically, a hollow rod tube constituting the fishing rod is integrated over its whole length from a reel seat to a handle-inserting portion by integrally forming on its upper side a flat side portion where the reel can be mounted and a tubular portion extending from this flat portion, and by securing a handle to this tubular extended portion, thereby making it possible to increase the strength of the casting handle portion of the rod, while reducing its weight.

It is another object of the present invention to provide a fishing rod which has an attached casting handle in which the hollow rod tube is directly touched, either on its reel seat or on its handle portion, when it is gripped during fishing, by securely fitting the handle into the tubular extended portion of the hollow rod tube behind the reel mounting portion in such a manner that part of the tubular extended portion is exposed, thereby making it possible for the force of the bite of the fish to be propagated through the handle and be sensed accurately and clearly by the fisherman.

To this end, a fishing rod of the present invention has a hollow rod tube which is made of reinforcing fibers impregnated with a thermosetting synthetic resin and which is provided on its upper side with a flat reel seat. A handle is securely fitted into a tubular extended portion which is integrally formed with the hollow rod tube behind the reel seat in such a manner that part of the tubular extended portion is exposed, while hoods fixing the feet of a reel are mounted on front and rear of the reel seat so as to face each other.

BRIEF DESCRIPTION OF THE DRAWINGS

FIG. 1 is a partly cutaway front view of a fishing rod according to the present invention;

FIGS. 2 to 5 are sectional views taken, respectively, along lines a—a, b—b, c—c, and d—d of FIG. 1;

FIG. 6 is an exploded perspective view of a fishing rod of FIG. 1;

FIG. 7 is a partly cutaway front view of another embodiment of the present invention;

FIGS. 8 to 11 are sectional views taken, respectively, along lines e—e, f—f, g—g, and h—h of FIG. 7

FIG. 12 is a perspective view of a third embodiment of the present invention;

FIGS. 13 and 14 are sectional views taken, respectively, along lines i—i and j—j of FIG. 12;

FIG. 15 is a perspective view of a fourth embodiment of the present invention;

FIG. 16 is a partly cutaway front view of the embodiment shown in FIG. 15;

FIGS. 17 and 18 are sectional views taken, respectively, along lines k—k and —of FIG. 16;

FIG. 19 is a partly cutaway front view of a fifth embodiment of the present invention;

FIGS. 20 to 22 are sectional views taken, respectively, along lines m—m, n—n, and o—o of FIG. 19;

FIG. 23 is a partly cutaway front view of a sixth embodiment of the present invention;

FIG. 24 is an exploded perspective view of the embodiment shown in FIG. 23;

FIGS. 25 to 28 are sectional views taken, respectively, along lines p—p, q—q, r—r, and s—s of FIG. 23; and FIG. 29 is a longitudinally-sectioned front view of a seventh embodiment of the present invention.

DESCRIPTION OF THE PREFERRED EMBODIMENTS

Embodiments of the present invention will be described hereinunder with reference to the accompanying drawings.

Referring first to FIGS. 1 to 6, a hollow rod tube 1, like a known fishing rod, is made of any known reinforcing fibers, such as glass fibers, carbon fibers, amide fibers or the like, impregnated with any thermosetting synthetic resin such as epoxy or polyester. The rear portion of the hollow rod tube 1 is formed in such a manner that it is wider and has flat portions on its upper and lower sides. A reel seat 2 is provided on the front side of the upper flat portion, while slots 4 are provided in the upper and lower sides of the flat portion of the hollow rod tube 1 behind the reel seat 2, which constitutes a tubular extended portion 3.

The upper side of a hood nember 7 is provided with a rear hood 5 for securing the foot of a reel, and the lower side thereof is provided with a trigger-like portion 6, and the hood member 7 is inserted into the front portion of the slots 4 by fitting grooves 8 of the hood member 7 to the edges which are located along both sides of the upper and lower slots 4. A handle 9 made of cork or a flexible or rigid synthetic resin, or the like, is secured to the tubular extended portion 3 behind the hood member 7. The handle 9 is provided with grooves 10 along both sides, and is inserted into the edges along the sides of the slots 4 in such a manner that the tubular extended portion 3 is exposed at the both sides of the handle 9.

A front hood 11 for securing the foot of the reel is mounted on the front portion of the reel seat 2 by a threaded bolt 12 in such a manner that it can be freely opened or closed so that the reel placed on the reel seat 2 in firmly held between the front hood 11 and the rear hood 5. In addition, a hood cover 13 is provided on the front portion of the front hood 11, while finger plates 14 are provided on front and rear of the threaded bolt 12, on the lower flat side of the hollow rod tube 1. A reinforcing plate 15 is mounted in the portion within the hollow tube 1 where the threaded bolt 12 is mounted.

In another embodiment shown in FIGS. 7 to 11, the rear hood 5 and the trigger-like portion 6, which constitute an individual part in the above-described embodiment, are integrally and continuously formed with the handle 9, and recesses 10' provided on each side of the handle 9 engage the edges along the upper and lower slots 4.

In FIGS. 12 to 14, which show a third embodiment of the invention, no slots are provided on the upper and lower sides of the tubular extended portion 3 of the hollow rod tube 1, and the handle 9 is securely fixed to the tubular extended portion 3. Both sides of the handle 9 are provided with through-holes 16 which expose the tubular extended portion 3.

In FIGS. 15 to 18, which illustrate a fourth embodiment of the invention, the rear half of the tubular extended portion 3 of the hollow rod tube 1 has a flat side only on its upper side. One slot 4 only is provided in this upper flat side, so that the rest of the tubular extended portion 3 apart from the upper side is exposed when the handle is fitted thereto. The trigger-like portion 6 is provided separately from the handle 9, and is secured by a setscrew 17.

In FIGS. 19 to 22, which show a fifth embodiment of the invention, the tubular extended portion 3 of the hollow rod tube 1 is formed in such a manner that it has a flat side on only the front part of its upper side, as well as on its lower side. One slot 4 is provided on the lower flat side, into which the handle 9 with the trigger-like portion 6 integrally formed therewith is fitted. The front hood 11 and the rear hood 5 are connected by a coupling member 18, and are mounted on the reel seat 2 of the hollow tube 1.

In FIGS. 23 and 28, which show a sixth embodiment of the invention, no slots 4 are formed on the tubular extended portion 3. The separately-formed rear hood 5 and the trigger-like portion 6 are each secured to a reinforcing material 19 fixed within the tubular extended portion 3, through through-holes 3' provided in the tubular extended portion 3, in such a manner that projections 5', 6', respectively engage holes 19' in the reinforcing material 19. An engagement member 21 provided with an engagement recess 20 between spaced arms 24 is securely fitted to the distal end of the tubular extended portion 3, and the recess 20 engages a projection 9' formed at the base between the bifurcated portions of the handle 9 so as to increase the rigidity of the handle and prevent any deformation of the handle 9 due to torsion when the handle 9 is in place.

In FIG. 29, which illustrates a seventh embodiment of the invention, the rear hood 5 and the trigger-like portion 6 are directly secured by engaging recesses and projections thereof without using any reinforcing material.

The fishing rod may be constructed as a jointed rod by joining the butt section constituted by the hollow rod tube 1 of the above-described embodiments with another tube. Alternatively, it may be constructed by employing only the hollow rod tube 1.

As will be understood from the foregoing description, in the fishing rod according to the present invention, the hollow rod tube is integrated over its whole length from a reel seat to a handle-securing portion, by providing the reel seat on a flat upper side thereof, and securing the handle to a tubular extended portion behind the reel seat in such a manner that part of the tubular extended portion is exposed. Therefore, the diameter of the casting handle of the rod need not be increased to increase the strength thereof, and its weight is reduced because the reel can be directly mounted onto the tube. Additionally, since the hollow rod tube can be directly touched, either on its reel seat or its handle portion, when it is gripped by the fisherman, it is possible for him to feel the bite of a fish properly, thereby enabling comfortable and smooth fishing.

What is claimed is:

1. A fishing rod, comprising:
   a hollow tubular rod made of a reinforced fiber impregnated with a thermosetting synthetic resin, said rod having a forward portion and a rearward portion, and further having on the upper side thereof a flat reel seat,
   a handle securely fitted to said rearward portion of said tubular rod such that a part of said tubular rod rearward portion is exposed for gripping contact by a user's hand,
   a front hood mounted on said butular rod forward portion, said front hood defining a rearwardly facing opening,
   a rear hood mounted on said tubular rod rearward portion, said rear hood defining a forwardly facing opening, said front hood and said rear hood together defining means for fixing the feet of a reel mounted on the reel seat of said tubular rod,
   said handle including a forward portion for engagement with said rearward portion of said tubular rod, said handle forward portion including laterally disposed engagement grooves, and
   a slot in at least one of the upper or lower sides of said rearward portion of said hollow tubular rod, whereby, in cross-section, said rearward portion of said tubular rod includes at least a pair of laterally opposed, spaced arms, said handle forward portion and said tubular rod rearward portion being securely interfitted with said part of said tubular rod being exposed upon insertion of said spaced arms of said tubular rod rearward portion into said engagement grooves of said handle forward portion.

2. In a fishing rod assembly including a tubular rod and a handle for supporting the tubular rod, the improvement wherein
   said handle includes a trigger grip at a forward end thereof,
   said tubular rod includes a rearward portion securely fitted to said handle with at least a part of said rearward portion being exposed, for gripping contact by a user's hand, on opposiing sides of said handle rearwardly of said trigger grip,
   said tubular rod includes an upper flat side on which a reel is to be mounted, and supports a front hood at a forward end of said upper flat side,
   a rear hood provided at said handle forward end,
   said front hood including a rearwardly facing opening and said rear hood including a forwardly facing opening, said front and rear hoods defining means, coacting with said upper flat side of said tubular rod, for securing said reel to said tubular rod, and
   said rear hood and said trigger grip being separately mountable on said handle forward portion at a predetermined location, and each of said rear hood and said trigger grip including projections which engage in apertures provided in the flat side of said tubular rod at said predetermined location.

3. The improvement of claim 2, and further including a reinforcing member housed within said tubular rod at said predetermined location, said projections of said rear hood and said trigger grip being further engaged in said reinforcing member.

4. The improvement of claim 2, wherein said projections of said rear hood and the projections of said trigger grip are configured for directly engaging one another within said tubular rod at said predetermined location.

* * * * *